(12) United States Patent
Destarac et al.

(10) Patent No.: US 6,777,513 B1
(45) Date of Patent: Aug. 17, 2004

(54) SYNTHESIS METHOD FOR POLYMERS BY CONTROLLED RADICAL POLYMERISATION USING HALOGENATED XANTHATES

(75) Inventors: Mathias Destarac, Paris (FR); Dominique Charmot, Los Gatos, CA (US); Samir Zard, Gif sur Yvette (FR); Xavier Franck, Chevilly Larue (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/980,387

(22) PCT Filed: May 26, 2000

(86) PCT No.: PCT/FR00/01438

§ 371 (c)(1),
(2), (4) Date: Apr. 8, 2002

(87) PCT Pub. No.: WO00/75207

PCT Pub. Date: Dec. 14, 2000

(30) Foreign Application Priority Data

Jun. 4, 1999 (FR) ............................. 99 07096

(51) Int. Cl.[7] .................................. C08F 2/00
(52) U.S. Cl. ................ 526/222; 526/204; 526/329.2; 526/330; 526/335; 526/342; 526/347
(58) Field of Search ................. 526/204, 222, 526/329.2, 330, 335, 342, 347

(56) References Cited

FOREIGN PATENT DOCUMENTS

WO  WO 02/22688 A2 * 3/2002

OTHER PUBLICATIONS

Ajayaghosh et al. Macromolecules (1998), 31, 1436–1438.*
Destarac et al. Macromolecular Rapid Communication (2002), 23, 1049–1054.*
Adamy et al. Macromolcules (2003), 36(7), 2293–2301.*

* cited by examiner

Primary Examiner—Helen L. Pezzuto

(57) ABSTRACT

The invention concerns a method for preparing polymers, which consists in contacting: an ethylenically unsaturated monomer; a soure of free radicals; and a halogenated xanthate.

18 Claims, 2 Drawing Sheets

FIG. 2

SYNTHESIS METHOD FOR POLYMERS BY CONTROLLED RADICAL POLYMERISATION USING HALOGENATED XANTHATES

This application is an application under 35 U.S.C. Section 371 of International Application Number PCT/FR00/01438 filed on May 26, 2000.

The present invention relates to a novel process for "controlled" or "living" free-radical polymerization, giving access to block copolymers.

Block polymers are usually prepared by ionic polymerization. A disadvantage of this type of polymerization is that it permits the polymerization only of certain types of non-polar monomers, particularly styrene and butadiene, and that it requires a particularly pure reaction environment, and temperatures often lower than ambient, in order to minimize side reactions, and the result is severe operational constraints.

An advantage of free-radical polymerization is that it is easy to implement without adhering to excessive purity requirements, and at temperatures of ambient or above. However, until recently there was no free-radical polymerization process which could give block polymers.

A novel process for free-radical polymerization has now been developed: this is what is known as "controlled" or "living" free-radical polymerization. Controlled free-radical polymerization proceeds by growth through propagation of macroradicals. These macroradicals have a very short lifetime and recombine irreversibly via coupling or dismutation. When the polymerization proceeds in the presence of a number of comonomers, the variation in the composition of the mixture is infinitely slow compared with the lifetime of the macroradical, and therefore the chains have a random sequence of monomer units, rather than a block-type sequence.

In recently developed techniques for controlled free-radical polymerization, the extremities of polymer chains can be reactivated as a radical by homolytic cleavage of a bond (for example C—O or C-halogen).

Controlled free-radical polymerization therefore has the following distinctive aspects:
1. the number of chains is fixed for the entire duration of the reaction,
2. all the chains grow at the same rate, resulting in:
   linear increase in molecular mass with conversion,
   a narrow distribution of masses,
3. the average molecular mass is controlled by the molar ratio monomer/chain precursor,
4. the possibility of preparing block copolymers.

The controlled character is all the more pronounced if the rate of reactivation of the free-radical chains is very great compared with the rate of growth of the chains (propagation). There are cases where this does not always apply (i.e. the reactivation rate of the free-radical chains is greater than or equal to the rate of propagation) and conditions 1 and 2 are not complied with, but it is nevertheless still possible to prepare block copolymers.

The publication WO 98/58974 describes a living free-radical polymerization process giving access to block copolymers by a process without UV irradiation, by using xanthate compounds, i.e. compounds having the function:

This free-radical polymerization allows preparation of block polymers with the aid of any kind of monomer, without any UV source. The polymers obtained do not contain any metallic impurities detrimental to their use. They have chain-end functionalization and a low polydispersity index, lower than 2, or even lower than 1.5.

It is an object of the present invention to propose a novel procedure for polymerization with the aid of new precursors of xanthate type.

Another object is to propose a polymerization process which uses precursors of xanthate type and during the course of which the number-average molar masses $M_n$ of the resultant polymers are well controlled, i.e. close to the theoretical values $M_{n\,th}$, especially at the start of the polymerization reaction.

Another object is to propose a polymerization process which uses precursors of xanthate type to synthesize polymers and block copolymers whose index of polydispersity ($M_w/M_n$) is low, i.e. close to 1.

With this object in mind, the invention provides a process for preparing polymers, characterized by bringing into contact:
- at least one ethylenically unsaturated monomer,
- at least one source of free radicals, and
- at least one compound (I) of general formula (IA), (IB), or (IC)

(IA)

(IB)

(IC)

in which:
$R^2$ and $R^{2'}$ represent:
an alkyl, acyl, aryl, alkene, or alkyne group (i), or
a carbocyclic system (ii), saturated or unsaturated, optionally aromatic, or
a heterocyclic system (iii), saturated or unsaturated,
these groups and cyclic systems (i), (ii), and (iii) being substituted by at least one fluorine atom, chlorine atom, and/or bromine atom, $R^1$ and $R^{1'}$ represent:
an alkyl, acyl, aryl, alkene, or alkyne group (i), optionally substituted, or
a carbocyclic system (ii), saturated or unsaturated, optionally substituted or aromatic, or
a heterocyclic system (iii), saturated or unsaturated, optionally substituted, where these groups and cyclic systems (i), (ii) and (iii) may be substituted by substituted phenyl groups, substituted aromatic groups, or: alkoxycarbonyl or aryloxycarbonyl (—COOR), carboxy (—COOH), acyloxy (—O₂CR), carbamoyl (—CONR₂), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR$_2$), halogen, allyl, epoxy, alkoxy (—OR), S-alkyl, or S-aryl groups, groups having hydrophilic or ionic character, for example the alkali metal salts of carboxylic acids, the alkali metal salts of a sulfonic acid, polyalkylene oxide chains (PEO, PPO), or cationic substituents (quaternary ammonium salts), R representing an alkyl or aryl group, or a polymer chain, is between 2 and 10.

The process according to the invention therefore consists in bringing into contact a source of free radicals, an ethylenically unsaturated monomer, and a compound (I) of formula (IA), (IB), or (IC).

This compound (I) bears a xanthate functionality. According to the essential characteristic of the invention, the xanthate functionality bears a group $R^2$ or $R^{2'}$ which has to be substituted by at least one fluorine atom, chlorine atom, and/or bromine atom. $R^2$ and $R^{2'}$ are preferably substituted by at least one fluorine atom, and still more preferably only by fluorine atoms.

According to one preferred version, $R^2$ represents a group of formula: —CH$_2$R$^{'5}$, in which R$^{'5}$ represents an alkyl group substituted by at least one fluorine atom, chlorine atom, and/or bromine atom. According to this embodiment, preferred groups $R^2$ are the following:

—CH$_2$CF$_3$,

—CH$_2$CF$_2$CF$_2$CF$_3$

—CH$_2$CH$_2$C$_6$F$_{13}$,

According to another preferred version, $R^2$ represents the group CH(CF$_3$)$_2$.

$R^1$ in the formulae (IA) and (IB) preferably represents:

a group of formula CR$^{'1}$R$^{'2}$R$^{'3}$, in which:.

a R$^{'1}$, R$^2$ and R$^{'3}$ represent the groups (i), (ii), or (iii) as defined above, or R$^{'1}$=R$^{'2}$=H and R$^{'3}$ is an aryl, alkene, or alkyne group, or a group of formula —COR$^{'4}$ in which R$^{'4}$ represents a group (i), (ii), or (iii) as defined above.

The most interesting results have been obtained for the compound (I) when $R^1$ is a group selected among:

—CH(CH$_3$) (CO$_2$Et)

—CH(CH$_3$) (C$_6$H$_5$)

—CH(CO$_2$Et)$_2$

—C(CH$_3$) (CO$_2$Et) (S—C$_6$H$_5$)

—C(CH$_3$)$_2$(C$_6$H$_5$)

in which Et represents an ethyl group and Ph represents a phenyl group.

The groups $R^1$ and $R^{1'}$ may also represent a polymer chain from a free-radical or ionic polymerization, or from a polycondensation. Preferred compounds of formula (IC) are those for which R$^{1'}$ is the group —CH$_2$— phenyl —CH$_2$— or the group —CHCH$_3$CO$_2$CH$_2$CH$_2$CO$_2$CHCH$_3$—.

In the preferred embodiment of the invention, the polymerization process uses a compound (I) formula (IA). Preferred compounds of formula (IA) are ethyl a-(O-heptafluorobutylxanthyl)propionate (R$^1$=CHCH$_3$ (CO$_2$Et), R$^2$=CH$_2$CF$_2$CF$_2$CF$_3$), ethyl a-(O-trifluoroethylxanthyl) propionate (R$^1$=CHCH$_3$(CO$_2$Et), R$^2$=CH$_2$CF$_3$), and ethyl ethyl a-(O-tridecafluorooctanylxanthyl)propionate (R$^1$=CHCH$_3$(CO$_2$Et), R$^2$=CH$_2$CH$_2$C$_6$F$_{13}$)

The compounds of formulae (IA), (IB), and (IC) are easily accessible. They may particularly be obtained by reacting an alcohol R$^2$OH with carbon disulfide CS$_2$ (in the presence of hydrogen hydride, for example), giving the xanthate R$^2$O (C=S)S$^-$Na$^+$. This xanthate is then reacted with an alkyl halide R$^1$X (X=halogen), giving the halogenated xanthate: R'O (C=S)—SR$^1$.

According to the process of the invention, the free-radical source is generally a free-radical polymerization initiator. However, for certain monomers, such as styrene, thermal initiation is sufficient to generate free radicals.

In the first case, the free-radical polymerization initiator may be selected be selected among conventional initiators used in free-radical polymerization, for example one of the following initiators:

hydrogen peroxides, such as: tert-butyl hydroperoxide, cumene hydroperoxide, tert-butylperoxy acetate, tert-butylperoxy benzoate, tert-butylperoxy octoate, tert-butylperoxy neodecanoate, tert-butylperoxy isobutarate, lauroyl peroxide, tert-amylperoxy pivalate, tert-butylperoxy pivalate, dicumyl peroxide, benzoyl peroxide, potassium persulfate, ammonium persulfate, azo compounds, such as: 2-2'-azobis(isobutyronitrile), 2,2'-azobis(2-butanenitrile), 4,4'-azobis(4-pentanoic acid), 1,1'-azobis(cyclohexanecarbonitrile), 2-(tert-butylazo)-2-cyanopropane, 2,2'-azobis[2-methyl-N-(1,1)-bis(hydroxymethyl)-2-hydroxyethyl]propionamide, 2,2'-azobis[2-methyl-N-hydroxyethyl]propionamide, 2,2'-azobis(N,N'-dimethyleneisobutyramidine) dichloride, 2,2'-azobis(2-amidinopropane) dichloride, 2,2'-azobis(N,N'-dimethyleneisobutyramide), 5 2,2'-azobis(2-methyl-N-[1,1-bis(hydroxymethyl)-2-hydroxyethyl]propionamide), 2,2'-azobis(2-methyl-N-[1,1-bis(hydroxymethyl)ethyl]propionamide), 2,2'-azobis[2-methyl-N-(2-hydroxyethyl)propionamide)], 2,2'-azobis(isobutyramide) dihydrate, redox systems including combinations such as:

mixtures of hydrogen peroxide, alkyl peroxide, peresters, percarbonates, and the like, and any one of the salts of iron, titanous salts, zinc formaldehyde-sulfoxylate, or sodium formaldehyde-sulfoxylate, and reducing sugars, persulfates, perborate, or perchlorate of alkali metals or of ammonium, combined with a bisulfite of an alkali metal, such as sodium metabisulfite, and reducing sugars, persulfate of an alkali metal combined with an arylphosphinic acid, such as benzenephosphonic acid and like compounds, and reducing sugars.

The amount of initiator to be used is generally calculated so that the amount of radicals generated, as a ratio to the amount of compound (II), is at most 20 mol %, preferably at most 5%.

According to the process of the invention, the ethylenically unsaturated monomers are more specifically selected among styrene or its derivatives, butadiene, chloroprene, (meth)acrylic esters, vinyl esters and vinyl nitriles. (Meth) acrylic esters denote the esters of acrylic acid and of methacrylic acid with hydrogenated or fluorinated $C_1$–$C_{12}$ alcohols, preferably $C_1$–$C_8$ alcohols. Among compounds of this type mention may be made of: methyl acrylate, ethyl acrylate, propyl acrylate, n-butyl acrylate, isobutyl acrylate, 2-ethylhexyl acrylate, tert-butyl acrylate, methyl methacrylate, ethyl methacrylate, n-butyl methacrylate, isobutyl methacrylate.

Vinyl nitrites include more particularly those having from 3 to 12 carbon atoms, such as, in particular, acrylonitrile and methacrylonitrile.

It should be noted that styrene may be partially or completely replaced by derivatives, such as alpha-methylstyrene or vinyltoluene.

Particular other ethylenically unsaturated monomers which may be used, alone or as a mixture, or which may be copolymerized with the above monomers, are:

vinyl esters of a carboxylic acid, e.g. vinyl acetate, vinyl Versatate®, vinyl propionate, vinyl halides, ethylenic unsaturated mono- and dicarboxylic acids, e.g. acrylic acid, methacrylic acid, itaconic acid, maleic acid, fumaric acid, and the monoalkyl esters of dicarboxylic acids of the type mentioned with alkanols preferably having from 1 to 4 carbon atoms, and their N-substituted derivatives, amides of unsaturated carboxylic acids, e.g. acrylamide, methacrylamide, N-methylolacrylamide, or methacrylamide, N-alkylacrslamides.

ethylenic monomers containing a sulfonic acid group and their alkali metal or ammonium salts, for example vinylsulfonic acid, vinylbenzenesulfonic acid, alpha-acrylamidomethylpropanesulfonic acid, 2-sulfoethylene methacrylate, amides of vinylamine, particularly vinylformamide or vinylacetamide, unsaturated ethylenic monomers containing a secondary, tertiary, or quaternary amino group, or a heterocyclic group containing nitrogen, for example vinylpyridines, vinylimidazole, aminoalkyl (meth)acrylates, and aminoalkyl(meth)acrylamides, e.g. dimethylaminoethyl acrylate, dimethylaminoethyl methacrylate, di-tert-butylaminoethyl acrylate, di-tert-butylaminoethyl methacrylate, dimethylaminomethylacrylamide, or -methacrylamide. It is equally possible to use zwitterionic monomers, for example sulfopropyl(dimethyl) aminopropyl acrylate.

To prepare polyvinylamines, the ethylenically unsaturated monomers used are preferably amides of vinylamine, for example vinylformamide or vinylacetamide. The polymer obtained is then hydrolyzed, the pH being acidic or basic.

To prepare polyvinyl alcohols, the ethylenically unsaturated monomers used are preferably vinyl esters of carboxylic acid, for example vinyl acetate. The polymer obtained is then hydrolyzed, the pH being acidic or basic.

The types and amounts of polymerizable monomers used according to the present invention vary as a function of the particular final application for which the polymer is destined. These variations are well known and can readily be calculated by the skilled worker.

The polymerization may be carried out in bulk, in solution, or in emulsion. It is preferably implemented in emulsion.

The process is preferably implemented semi-continuously.

The temperature may vary between ambient temperature and 150° C., according to the nature of the monomers used.

The instantaneous polymer content as a ratio of the instantaneous amount of monomer and of polymer during the polymerization is generally between 50 and 99% by weight, preferably between 75 and 99%, still more preferably between 90 and 99%. This content is maintained in a known manner, via control of the temperature, of the addition rate of the reactants, and, optionally, of the polymerization initiator.

The process is generally implemented in the absence of any UV source.

The process of the invention has the advantage of allowing control of the number-average molecular masses $M_n$ of the polymers. Thus these masses $M_n$ are close to the theoretical values $M_{n\ th}$, where $M_{n\ th}$ is given by the following formula $$M_{nth} = \frac{[M]_0}{[P]_0} \frac{X}{100} M_0$$

in which:

$[M]_0$ represents the initial molar concentration of monomer $[P]_0$ represents the initial concentration of precursor compound X represents the monomer conversion expressed as a percentage $M_0$ represents the molar mass of the monomer (g/mol).

According to the present invention, the control of $M_n$ is particularly apparent at the start of the polymerization.

In addition, the polymerization process according to the present invention leads to polymers with a low polydispersity index ($Ip=M_w/M_n$, where $M_w$: weight-average molecular mass), close to 1.

The invention therefore also provides polymers obtainable by the process consisting of bringing at least one ethylenically unsaturated monomer into contact with at least one source of free radicals and at least one compound of formula (IA), (IB), or (IC).

The polymers generally have a polydispersity index of at most 2, preferably of at most 1.5.

The invention also provides a process for preparing multiblock polymers, in which the implementation of the polymerization process described above is repeated at least once, using:

compared with the preceding implementation, different monomers, and instead of the compound (I) of formula (IA), (IB), or (IC), the polymer from the preceding implementation, known as a precursor polymer.

The complete process for synthesizing a block polymer according to the invention may therefore consist in:

(1) synthesizing a precursor polymer by ringing into contact an ethylenically unsaturated monomer, a source of free radicals, and a compound of formula (IA), (IB), or (IC), (2) using the precursor polymer obtained in step (1) to prepare a diblock polymer by bringing this precursor polymer into contact with a new ethylenically unsaturated monomer and a source of free radicals.

This step (2) may be repeated as many times as desired with new monomers, to synthesize new blocks and obtain a multiblock polymer.

If the implementation is repeated once, a triblock polymer will be obtained, and if it is repeated a second time, a "quadriblock" polymer will be obtained, and so on. With each fresh implementation, therefore, the product obtained is a block polymer having an additional polymer block.

To prepare multiblock polymers, therefore, the process consists in repeating the implementation of the preceding process a number of times on the block polymer coming from each preceding implementation, with different monomers.

The compounds of formula (IB) and (IC) are particularly interesting because they allow a polymer chain to be grown at at least two active sites. With compounds such as these it is possible to economize on polymerization steps to obtain a copolymer of n blocks. Thus, if the value of p is 2 in the formula (IB) or (IC), the first block is obtained by polymerizing a monomer M1 in the presence of the compound of formula (IB) or (IC). This first block may then grow at each of its extremities via polymerization of a second monomer M2. A triblock copolymer is obtained, and this triblock polymer itself can grow at each of its extremities via polymerization of a third monomer M3. Thus, a "pentablock" copolymer is obtained in only three steps. If p is greater than 2, the process can give homopolymers or block copolymers whose structure is "multi-branched" or hyperbranched.

According to this process for preparing multiblock polymers, if it is desired that the block polymers obtained are homogeneous and do not have a composition gradient, and if all of the successive polymerizations are carried out in the same reactor, it is essential that all the monomers used in one step are consumed before the polymerization of the next step starts, e.g. before the new monomers are introduced.

As for the process for polymerizing a monoblock polymer, this process for polymerizing block polymers has the advantage of leading to block polymers having a low polydispersity index. It also allows control of the molecular mass of block polymers.

The invention therefore provides block polymers obtainable by the preceding process.

These block polymers generally have a polydispersity index of at most 2, preferably of at most 1.5.

The invention particularly provides block polymers which have at least two polymer blocks selected among the following partners:

polystyrene/polymethyl acrylate
polystyrene/polyethyl acrylate,
polystyrene/polytert-butyl acrylate,
polyethyl acrylate/polyvinyl acetate,
polybutyl acrylate/polyvinyl acetate
polytert-butyl acrylate/polyvinyl acetate.

When use is made of compounds of formula (IA), the block polymers obtained have a structure of the type:

(IIIA)

in which:
R², R¹ are as defined above,
V, V', W and W' are identical or different and represent: H, an alkyl group, or a halogen,
X, X', Y, and Y' are identical or different and represent H, a halogen, or an $R^3$, $OR^3$, $O_2COR^3$, NHCOH, OH, $NH_2$, $NHR^3$, $N(R^3)_2$, $(R^3)_2N^+O^-$, $NHCOR^3$, $CO_2H$, $CO_2R^3$, CN, $CONH_2$, $CONHR^3$ or $CONR^3_2$ group, in which $R_3$ is selected among alkyl, aryl, aralkyl, alkaryl, alkene, or organosilyl groups, optionally perfluorinated, and optinally substituted by one or more carboxy, epoxy, hydroxyl, alkoxy, amino, halogen, or sulfonic groups, a and b are identical or different and have values 0 or 1, m and n are identical or different and are greater than or equal to 1, and if one of these is greater than 1, the repeat units are identical or different.

These block polymers are the result of bringing into contact:

an ethylenically unsaturated monomer of formula: CYY' $(=CW-CW')_b=CH_2$, a precursor polymer of general formula (IIA):

(IIA)

a source of free radicals.

The polymer (IIA) is the result of bringing into contact an ethylenically unsaturated monomer of formula: CXX' $(=CV-CV')_a=CH_2$, a compound (I) of general formula (IA) and a source of free radicals.

In the formula (IIA), n is preferably greater than or equal to 6.

Particularly preferred compounds (IIA) are homopolymers of styrene (Y'=H, Y=C₆H₅, b=0), of methyl acrylate (Y'=H, Y=COOMe, b=0), of ethyl acrylate (Y'=H, Y=COOEt, b=0), of butyl acrylate (Y'=H, Y=COOBu, b=0), of tert-butyl acrylate (Y'=H. Y=COOtBu, b=0), of vinyl acetate (Y'=H, Y=OCOMe, b=0), of acrylic acid (Y'=H, Y=COOH, b=0), and for which:

R¹=CHCH₃(CO₂Et), CH(CO₂Et)₂, or C(CH₃)₂(C₆H₅), and

R²=—CH₂CF₃, —CH₂CF₂CF₂CF₃, or CH₂CH₂C₆F₁₃.

The examples below illustrate the invention but do not restrict its scope.

EXAMPLES

Example 1

Syntheses of Precursosrs of Formula (IA)

Example 1.1

Synthesis of the Precursor Ethyl a-(O-heptafluorobutylxanthyl)propionate (A)

1 g (5 mmol) of heptafluorobutanol is dissolved in 10 ml of DMF (N,N-dimethylformamide) in a glass flask. 0.6 ml (10 mmol) of CS₂ is added. The solution is cooled to 0° C., and then 0.24 g (5 mmol) of NaH is added. After 1 hour of stirring at 0° C., 0.6 ml (4.5 mmol) of ethyl 2-bromopropionate is added. The solution is stirred for 1 hour at 0° C., then 2 hours at ambient temperature, before being diluted with ethyl ether. It is then washed with water, and then with brine. The organic phase is concentrated in vacuo, and then the crude product is purified through a column (9/1: heptane/ethyl acetate). 1.5 g (88% yield) of product A are isolated.

Example 1.2

Synthesis of the Precursor Ethyl a-(O-trifluoroethylxanthyl)propionate (B)

2 g (20 mmol) of trifluoroethanol are dissolved in 40 ml of DMF in a glass flask. 2.4 ml (40 mmol) of $CS_2$ are added. The solution is cooled to 0° C., and then 0.96 g (20 mmol) of NaH is added. After 1 hour of stirring at 0° C., 2.34 ml (18 mmol) of ethyl 2-bromopropionate is added. The solution is stirred for 1 hour at 0° C., then two hours at ambient temperature, before being diluted with ethyl ether. It is then washed with water, and then with brine. The organic phase is concentrated in vacuo, and then the crude product is purified through a column (9/1: heptane/ethyl acetate). 3.4 g (69% yield) of xanthate B are isolated.

Example 1.3

Synthesis of the Precursor Ethyl a-(O-tridecafluorooctanylxanthyl)propionate (C)

1.1 ml (5 mmol) of tridecafluorooctanol are dissolved in 10 ml of DMF in a glass flask. 0.6 ml (10 mmol) of $CS_2$ is added. The solution is cooled to 0° C., and then 0.24 g (5 mmol) of NaH is added. After 1 hour of stirring at 0° C., 0.6 ml (4.5 mmol) of ethyl 2-bromopropionate is added. The solution is stirred for 1 hour at 0° C., train 2 hours at ambient temperature, before being diluted with ethyl ether. It is then washed with water, and then with brine. The organic phase is concentrated in vacuo, and then the crude product is purified through a column (9/1: heptane/ethyl acetate). 2.27 g (93% yield) of xanthate C are isolated.

Examples 2

Syntheses of Polymers (Homopolymers)

These examples show that the free-radical polymerization is controlled due to the use of the xanthates of the invention.

In the examples below the polymers are analyzed by GPC with THF as eluting solvent; $M_n$ is expressed in polystyrene equivalents (g/mol).

Example 2.1

Homopolymerization of Ethyl Acrylate in the Presence of B 0.02 mmol of azobisisobutyronitrile (AIBN) (3.38 mg), 54.9 mmol of ethyl acrylate (5.5 g)

0.69 mmol of xanthate B (0.19 g)

5.97 cm³ of toiuene (5.17 g). are introduced into a glass flask.

The solution obtained is divided into eight A fractions distributed over the same number of Carius tubes. The tubes are connected to a vacuum line, and immersed in liquid nitrogen, and then the contents of each tube are subjected to three cycles of "freezing/vacuum/back to ambient" to degas the tubes. They are then vacuum-sealed. After return to ambient, they are immersed in an oil bath preheated to 80° C. They are taken from the oil bath in sequence at regular intervals of time (t) and immersed in liquid nitrogen so that the polymerization is ended and the tubes can be analyzed.

The polymer is recovered by opening the tube and then evaporating traces of residual monomer.

Both of the following are tested:

precursor conversion by GPC (UV detection), and monomer conversion by gravimetric analysis.

Figure 1:
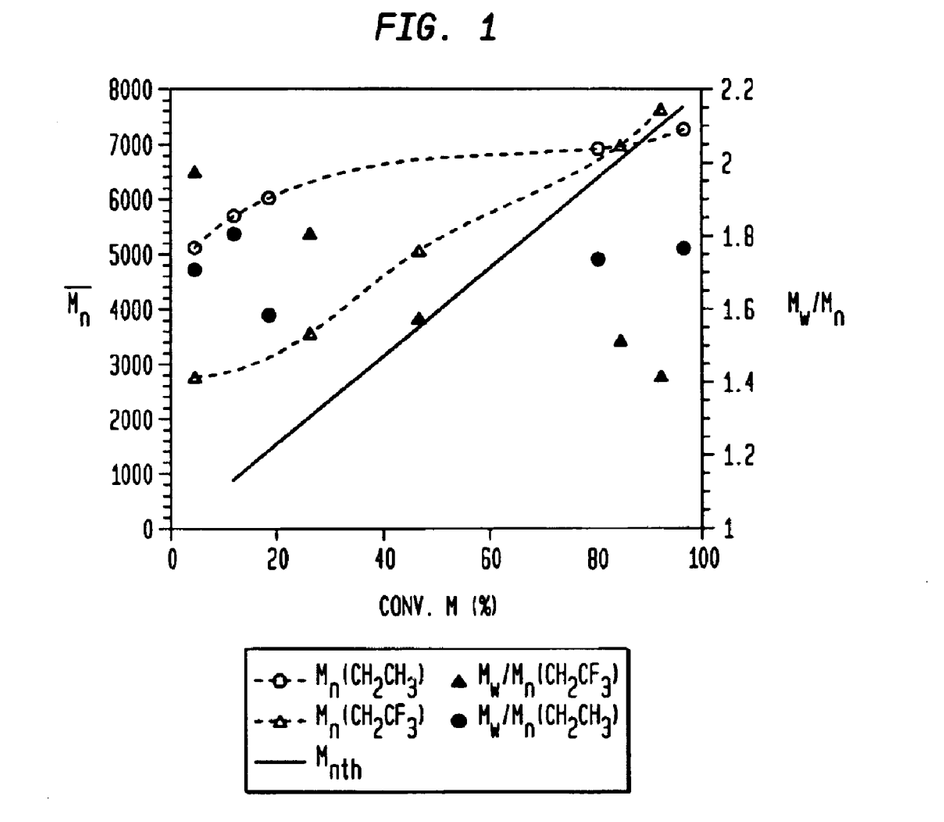
FIG. 1 gives curves for $M_n$ and $M_w/M_n$ as a function of the conversion rate of the ethyl acrylate monomer when using a xanthate according to the invention and of a xanthate according to the prior art.

The results obtained are reported in table 1 and FIG. 1.

TABLE 1

| Test | t (min) | Monomer conversion (%) | Precursor conversion (%) | $M_n$ | $M_w/M_n$ |
|---|---|---|---|---|---|
| 1 | 5 | <1 | | | |
| 2 | 15 | 4.2 | 36.3 | 2 790 | 1.98 |
| 3 | 20 | 11 | 72.6 | 2 940 | 2.00 |
| 4 | 25 | 25.7 | 73.4 | 3 600 | 1.81 |
| 5 | 35 | 46.4 | 92 | 5 115 | 1.58 |
| 6 | 53 | 84.1 | >99 | 6 756 | 1.52 |
| 7 | 80 | 89.9 | >99 | 7 716 | 1.43 |
| 8 | 140 | 91.8 | >99 | 7 946 | 1.42 |

FIG. 1 compares the results obtained with the xanthate B and those obtained with ethyl a-(O-ethylxanthyl)propionate ($R^2$=ethyl), under the same conditions of initial molar concentrations and temperature.

The value of $M_n$ is found to be better controlled with xanthate B: the value approaches the theoretical value ($M_{n\ th}$) from the start of the polymerization, unlike in the case of the polymerization with the xanthate of the prior art (ethyl a-(O-ethylxanthyl)propionate).

In addition, the value of $M_w/M_n$ tends rapidly. toward 1 in the case of xanthate B, whereas this value remains stable at more than 1.6 for the xanthate of the prior art (ethyl a-(O-ethylxanthyl)propionate).

Example 2.2

Homopolymerization of Ethyl Acrylate in the Presence of C 1.08 ml are taken from a solution composed of 3.9 mg of AIBN and 7.5 ml of ethyl acrylate. This fraction is added to 68.1 mg (0.126 mmol) of xanthate C in a Carius tube. The tube is degassed, then vacuum-sealed. The reaction takes 21 h at 80° C.

The monomer conversion is 95%.

The xanthate conversion is 100%.

The value of $M_n$ is 9 400 g/mol

The value of $M_w/M_n$ is 1.48.

At a high conversion rate, the value of the polymerization index is found to be low, and close to 1.

Example 2.3

Homopolymerization of Ethyl Acrylate in the Presence of A 0.01 mmol of AIBN (1.69 mg), 31.9 mmol of ethyl acrylate (3.192 g)

0.4 mmol of xanthate A (0.15 g)

3.47 cm³ of toluene (3 g). are introduced into a glass flask.

Five tubes are prepared and vacuum-sealed in a manner-similar to that used in example 2.1. The analyses are carried out in the same manner.

The results are reported in table 2.

TABLE 2

| Test | t (min) | Monomer conversion (%) | Precursor conversion (%) | $M_n$ | $M_w/M_n$ |
|---|---|---|---|---|---|
| 1 | 15 | <1 | | | |
| 2 | 25 | 11.3 | 42.6 | 3 603 | 1.76 |
| 3 | 35 | 24.7 | 70.4 | 4 590 | 1.62 |
| 4 | 45 | 45.3 | 93.9 | 5 934 | 1.55 |
| 5 | 90 | 81.8 | >99 | 8 380 | 1.41 |

At high conversion, the values of the polydispersity index is found to be close to 1.4.

Example 2.4

Homopolymerization of Styrene in the Presence of B 3.016 g (3.32 ml, 28.9 mmol) of styrene
0.1 g (0.36 mmol) of xanthate B
3.32 ml of toluene. are introduced into a glass flask.

The mixture obtained is separated into 5 fractions distributed among the same number of Carius tubes. These are degassed, then vacuum-sealed, and then placed in an oven kept at 110° C. At regular intervals of time the tubes are removed, cooled, and then opened. The results obtained are given in table 3 and FIG. 2.

TABLE 3

| Test | T (hours) | Monomer conversion (%) | $M_n$ | $M_w/M_n$ |
|---|---|---|---|---|
| 1 | 2 | 7.8 | 2 660 | 1.93 |
| 2 | 5.33 | 16 | 2 940 | 1.89 |
| 3 | 16.25 | 28 | 3 520 | 1.77 |
| 4 | 25.5 | 41.1 | 3 830 | 1.76 |
| 5 | 89.5 | 65.8 | 5 600 | 1.57 |

Figure 2:
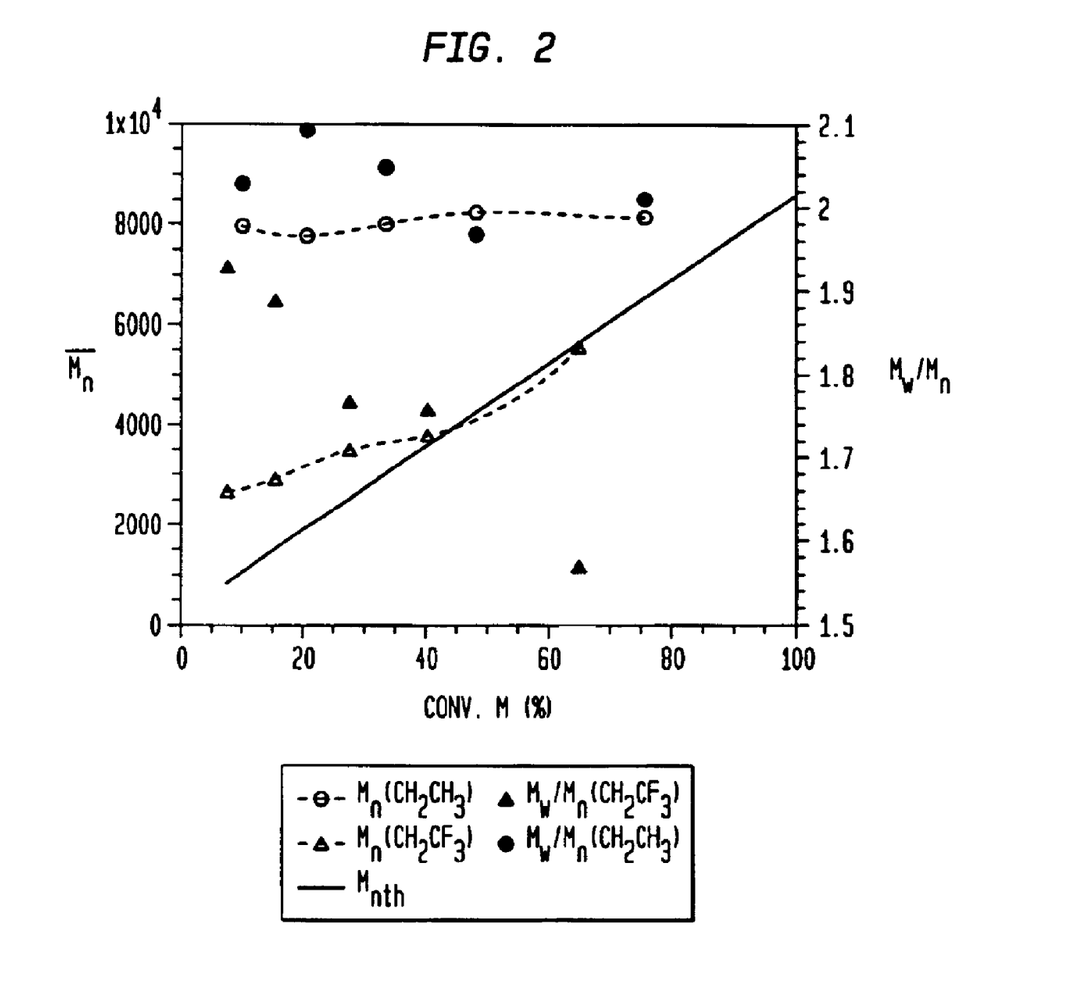
FIG. 2 gives curves for $M_n$ and $M_w/M_n$ as a function of the conversion rate of the styrene monomer when using a xanthate according to the invention and of a xwanthate according to the prior art.

FIG. 2 compares the results obtained with xanthate B and those obtained with ethyl a-(O-ethylxanthyl)propionate ($R^2$=ethyl), under the same conditions of initial molar concentrations and temperature.

The value of $M_n$ is found to be better controlled with xanthate B: the value approaches the theoretical value ($M_{n\ th}$) from the start of the polymerization, unlike in the case of the polymerization with the xanthate of the prior art (ethyl a-(O-ethylxanthyl)propionate).

In addition, the value of $M_w/M_n$ tends rapidly toward 1 in the case of xanthate B, whereas this value remains stable at about 2 for the xanthate of the prior art (ethyl a-(O-ethylxanthyl)propionate).

Example 2.5

Homopolymerization of Vinyl Acetate in the Presence of B 4.73 g (55 mmol) of vinyl acetate
0.19 g.(0.69 mmol) of xanthate B
3.38 mg (0.02 mmol) of AIBN. are introduced into a glass tube.

The tube is degassed, then vacuum-sealed. After 8 h 20 at 60° C., the tube is opened and the polymer is analyzed:

monomer conversion: 11.3%
$M_n$=740 g/mol
$M_w/M_n$=1.19.

Under the same conditions of temperature and of initial concentration, it is found that the xanthate of the prior art (ethyl a-(O-ethylxanthyl)propionate) allows $M_n$ to be controlled (<1000 g/mol) to approximately 10% monomer conversion, while the value of $M_w/M_n$ remains in the vicinity of 1.5.

Example 2.6

Homopolymerization of Styrene in the Presence of B 0.81 g (0.9 ml, 7.8 mmol) of styrene
27.7 mg (0.1 mmol) of xanthate B
0.93 ml of toluene.
are introduced into a glass tube.

The tube is degassed, then vacuum-sealed. After 114 hours at 120° C., the tube is opened and the polymer is characterized. The results are as follows:

monomer conversion: 84.4%
$M_n$=7 500 g/mol
$M_w/M_n$=1.57

At high conversion the value of the polymerization index is found to be low and close to 1.

Example 2.7

Homopolymerization of Ethyl Acrylate in the Presence of B 1.61 g (1.75 ml, 16.1 mmol) of ethyl acrylate
52.6 mg (0.19 mmol) of xanthate B
1.84 ml of toluene.
are introduced into a glass tube.

The tube is degassed, then vacuum-sealed. After 20'hours at 80° C., the tube is opened and the polymer is characterized. The results are as follows:

monomer conversion: 88.1%
$M_n$=8 200 g/mol
$M_w/M_n$=1.69

At high conversion the value of the polymerization index is found to be low and close to 1.

Example 3

Syntheses of Block Polymers

Example 3.1

Synthesis of a Polystyrene-b-ethyl Polyacrylate Diblock Copolymer 0.25 g of the polystyrene described in example 2.6
0.3 g (3 mmol) of ethyl acrylate
0.15 mg (9.10$^{-7}$ mol) of AIBN
0.57 ml of toluene are introduced into a glass tube.

13

The tube is degassed, then vacuum-sealed. After 20 h at 120° C., the tube is opened and the copolymer is characterized. The results are as follows:

monomer conversion: 40.1%
$M_n$=12 400 g/mol
$M_w/M_n$=1.45.

Under the same conditions of temperature and of initial concentration, it is found that the xanthate of the prior art (ethyl a-(O-ethylxanthyl)propionate) leads to a diblock copolymer having a polydispersity index of 1.8.

Example 3.2

Synthesis of a Polystyrene-b-butyl Polyacrylate Diblock Copolymer 0.175 g of the polystyrene described in example 2.6
0.27 g (2.12 mmol) of butyl acrylate
0.15 mg ($9.10^{-7}$ mol) of AIBN
0.57 ml of toluene
are introduced into a glass tube.

The tube is degassed, then vacuum-sealed. After 20 h at 120° C., the tube is opened and the copolymer is characterized. The results are as follows:

monomer conversion: 42.4%
$M_n$=12 100 g/mol
$M_w/M_n$=1.66.

Example 3.3

Synthesis of a Polyethyl Acrylate-b-polyvinyl Acetate Diblock Copolymer 0.2 g of the polyethyl acrylate described in example 2.7
0.2 g (2.3 mmol) of vinyl acetate
0.44 mg ($3.6.10^{-6}$ mol) of AIBN
0.32 g of methyl ethyl ketone are introduced into a glass tube.

The tube is degassed, then vacuum-sealed. After 20 h at 80° C., the tube is opened and the polymer is characterized. The results are as follows:

monomer conversion: 71%
$M_n$=13 300 g/mol
$M_w/M_n$=1.66.

Example 3.4

Synthesis of a Polystyrene-b-polyvinyl Acetate Diblock Copolymer 0.2 g of the polystyrene described in example 2.6
0.2 g (2.3 mmol) of vinyl acetate
0.44 mg (3.6.10 6 mol) of AIBN
0.32 ml of toluene
are introduced into a glass tube.

The tube is degassed, then vacuum-sealed. After 20 h at 80° C., the tube is opened and the polymer is characterized. The results are as follows:

monomer conversion: 74%
$M_n$=12 800 g/mol
$M_w/M_n$=1.61.

14

What is claimed is:

1. A process for preparing polymers, comprising to steps of:
   a) bringing into contact to obtain a polymer:
      at least one ethylenically unsaturated monomer,
      at least one source of free radicals, and
      at least one compound of general formula (IA), or (IC):

(IA)

(IC)

wherein:
$R^2$ represents a group of formula: —$CH_2R^{5'}$, wherein $R^{5'}$ represents an alkyl group substituted by at least one fluorine atom, chlorine atom, or bromine atom;
$R^1$ and $R^{1'}$ represent:
   an alkyl, acyl, aryl, alkene, or alkyne group (i), optionally substituted,
   a carbocyclic system (ii), saturated or unsaturated, optionally substituted or aromatic,
   a heterocyclic system (iii), saturated or unsaturated, optionally substituted,
these groups and cyclic systems (i), (ii) and (iii) being optionally substituted by substituted phenyl groups, substituted aromatic groups, alkoxycarbonyl or aryloxycarbonyl (—COOR) groups, carboxy (—COOH) groups, acyloxy (—$O_2CR$) groups, carbamoyl (—$CONR_2$) groups, cyano (—CN) groups, alkylcarbonyl groups, alkylarylcarbonyl groups, arylcarbonyl groups, arylalkylcarbonyl groups, phthalimido groups, maleimido groups, succinimido groups, amnidino groups, guanidimo groups, hydroxyl (—OH) groups, amino (—$NR_2$) groups, halogen atoms, allyl groups, epoxy groups, alkoxy (—OR) groups, S-alkyl groups, S-aryl groups, or groups having hydrophilic or ionic character, R representing an alkyl or aryl group, or
   a polymer chain,
   p is between 2 and 10, and
   b) recovering the polymer.

2. A process according to claim 1, wherein the group having hydrophilic or ionic character is selected from the group consisting of alkali metal salts of carboxylic acids, the akali metal salts of a sulfonic acid, polyalkylene oxide chains, and quaternary ammonium salts.

3. The process according to claim 1, wherein $R^2$ is substituted by at least one fluorine atom.

4. The process according to claim 1, wherein $R^2$ is:
   $CH_2CF_3$,
   $CH_2CF_2CF_2CF_3$ or
   $CH_2CH_2C_6F_{13}$.

5. The process according to claim 1, wherein $R^1$ represents:
   a group of formula $CR^{1'}R^{2'}R^{3'}$, wherein:
   $R'$, $R^{2'}$ and $R^{3'}$ represent the groups (i), (ii), or (iii), or
   $R^{1'}=R^{2'}=H$ and $R^{3'}$ is an aryl, alkene, or alkyne group, or
   a group of formula —$COR^{4'}$, wherein $R^{4'}$ represents a group (i (ii), or (iii).

6. The process according to claim 5, wherein $R^1$ is:
CH(CH$_3$)(CO$_2$Et),
CH(CH$_3$)(C$_6$H$_5$),
CH(CO$_2$Et)$_2$,
C(CH$_3$)(CO$_2$Et)(S—C$_6$H$_5$),
C(CH$_3$)(C$_6$H$_5$), or 7. The process according to claim 1, wherein step a) comprises bringing into contact a compound of formula (IA).

8. The process according to claim 7, wherein the compound of formula(IA) is selected from the group consisting of ethyl a-(O-heptafluorobutylxanthyl)propionate, ethyl a-(O-trifluoroethylxanthyl)propionate, and ethyl a-(O-tridecafluorooctanylxanthyl)propionate.

9. The process according to claim 1, wherein the ethylenically unsaturated monomer is selected from the group consisting of styrene or its derivatives, butadiene, chloroprene, (meth)acrylic esters, and vinyl nitrites.

10. The process as according to claim 9, wherein the ethylenically unsaturated monomer is selected from the group consisting of vinyl acetate, and vinyl propionate.

11. A polymer obtained by the process which essentially consists in bringing an ethylenically unsaturated monomer into contact with a source of free radicals and a compound of formula (IA), (IB), or (IC) as defined in claim 1.

12. The polymer according to claim 11, having a polydispersity index of at most 2.

13. The polymer according to claim 12, wherein the polydispersity index is of at most 1.5.

14. A process for preparing multiblock polymers, comprising the following steps:

step 1: carrying out step a) according to claim 1, to obtain a block polymer step(s) 2: repeating at least once the preceding step with different monomers from the preceding step, and with the block polymer obtained from the preceding step instead of the precursor compound of formula (IA), (IB), or (IC), to obtain a multiblock polymer, and step 3: recovering the multiblock polymer.

15. A multiblock polymer obtained by the process according to claim 14.

16. The multiblock polymer according to claim 15, having an index of polydispersity of at most 2.

17. The multiblock polymer according to claim 16, wherein the index of polydispersity is of at most 1.5.

18. A multiblock polymer according to claim 15, comprising at least two polymer blocks selected from the group consisting of the following associations of blocks:

polystyrene and polymethyl acrylate, polystyrene and polyethyl acrylate, polystyrene and polytert-butyl acrylate, polyethyl acrylate and polyvinyl acetate, polybutyl acrylate and polyvinyl acetate, and polytert-butyl acrylate and polyvinyl acetate.

* * * * *